March 11, 1969    J. MORENO    3,432,755
DISTRESS SIGNALLING DEVICE FOR SUBMARINE AND AIRCRAFT
Filed Oct. 3, 1966    Sheet 1 of 2
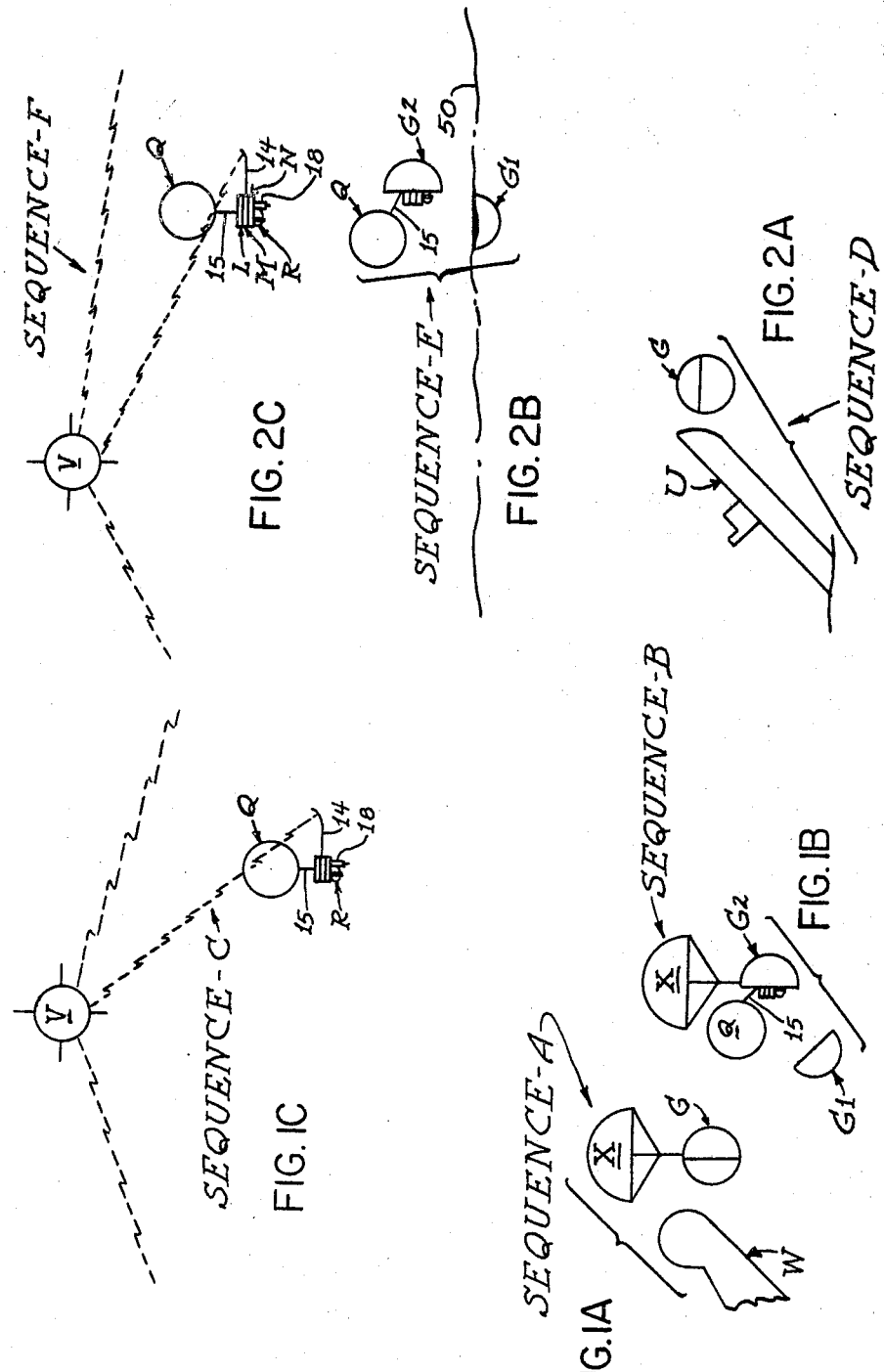
INVENTOR
JOE MORENO
BY William R. Piper
ATTORNEY March 11, 1969 — J. MORENO — 3,432,755
DISTRESS SIGNALLING DEVICE FOR SUBMARINE AND AIRCRAFT
Filed Oct. 3, 1966
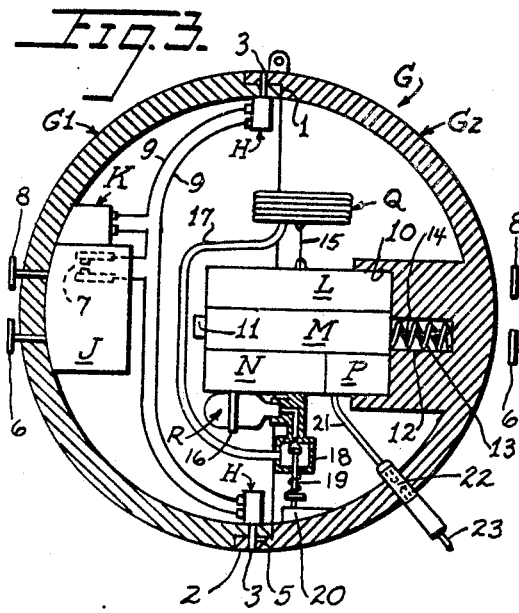
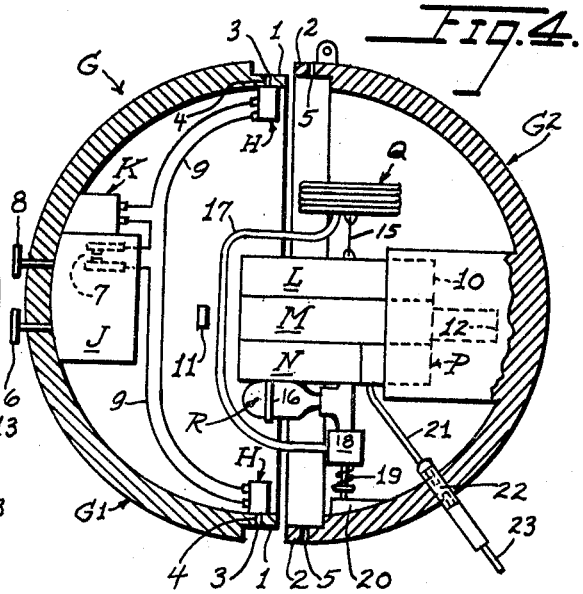
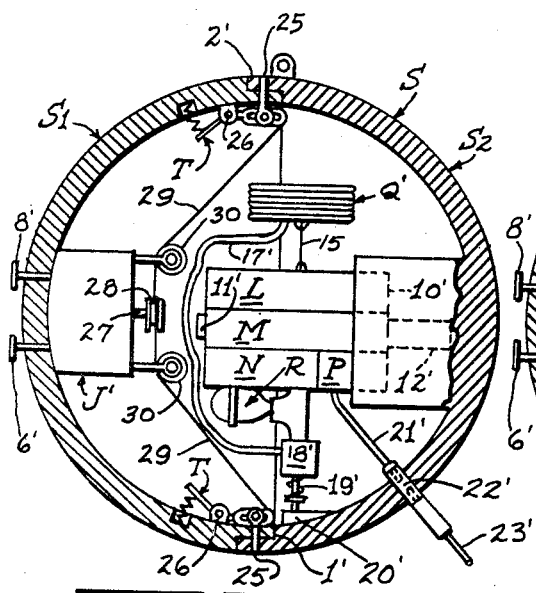
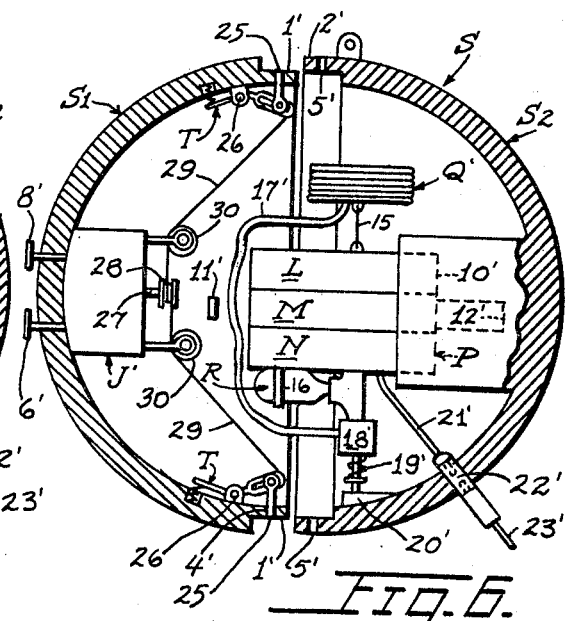
INVENTOR
JOE MORENO
BY William R. Piper
ATTORNEY

United States Patent Office 3,432,755
Patented Mar. 11, 1969

3,432,755
DISTRESS SIGNALLING DEVICE FOR SUBMARINE AND AIRCRAFT
Joe Moreno, 1302 Orchard Ave.,
San Leandro, Calif. 94577
Filed Oct. 3, 1966, Ser. No. 583,738
U.S. Cl. 325—112                4 Claims
Int. Cl. H04b 1/02, 1/04

ABSTRACT OF THE DISCLOSURE

A distress signalling device for submarine and aircraft in which a two part sphere can be released from the craft in case of emergency, the sphere being automatically opened after a predetermined time delay to permit the sphere to rise to the surface of the water before opening in case it is released from a submarine or in case it is released from an airplane, to permit the airplane to clear the sphere before the latter opens. The opening of the sphere will release a balloon supported package that contains a radio transmitter, a tape deck that contains the emergency message, and a battery for operating the tape deck and the transmitter for brodacasting the message to radio-receiving stations or to a satellite for retransmission.

---

One of the big problems when a submarine becomes disabled while at sea or an aircraft becomes disabled or crashes during flight is to promptly locate the disabled craft so that emergency help can be provided as soon as possible. It might be possible to save lives and give first aid treatment to victims if the location of the accident could be immediately provided.

An object of my invention is to provide a device that can transmit the location of the disaster in latitude, longitude and depth in case a submarine becomes submerged with complete power failure. The device can also be used to give the location of an aircraft should it become disabled while in fiight and either makes a forced landing or crashes. The device can be carried by bombers, commercial aircraft or large military cargo aircraft carrying large numbers of personnel, valuable cargo or classified material. As the aircraft encounters an emergency condition, the pilot can turn on the recording mechanism in the device. During the time the pilot is trying to establish radio contact and/or calling "Mayday" and giving his location in latitude and longitude, the recording mechanism is making a tape recording of this information. The reason for the emergency can also be tape recorded.

If after a period of time radio contact is not established or if the nature of the emergency requires immediate action, a timer in the device is set to function at once or after a desired lapse of time up to about five minutes. The device is then released from the aircraft with a supporting parachute. In the case of a submarine, the device would be released without a parachute and because of the buoyancy of the container in which the device is enclosed, the container would immediately rise to the surface of the water. A lighter than air gas can be used in the container to increase its buoyancy.

Novel time controlled means is provided in the device for releasing the tape recording mechanism and radio transmitter and for inflating a balloon for causing the latter to lift the tape recording mechanism and transmitter into the air. The same message that the pilot recorded on the tape is now broadcasted and continually repeated for a protracted period of time. This radio message can be picked up by radio receivers mounted in search airplanes that are tuned to the same frequency or by an orbiting satellite that could receive the distress signal and rebroadcast it to the nearest radio receiver whether the latter is a land station or on an airplane or a surface vessel.

The device is simple in construction and is designed to be ready for instant use when an emergency arises. The only difference between the device when used for giving the location of a submarine and that of an aircraft is that a parachute is provided when the device is launched from a flying aircraft and of course a parachute is not needed when launching the device from a submerged submarine.

Other objects and advantages will appear as the specification continues and the novel features of the invention will be set forth in the appended claims.

Drawings

For a better understanding of my invention, reference should be made to the accompanying drawings, forming a part of this application in which:

FIGURES 1A, 1B, and 1C, show diagrammatically three sequences A, B and C of the device when used to give the location of a disabled aircraft. Sequence A, see FIGURE 1A, illustrates the device being released from an aircraft as the aircraft descends, the device being initially supported by a parachute. Sequence B, see FIGURE 1B, shows the timing mechanism opening the spherical container and inflating the balloon preparatory to supporting the device in lieu of the parachute, and sequence C, see FIGURE 1C, illustrates the device freed from its spherical container and being airborne by the balloon, the device continually broadcasting the location of the aircraft and any other data recorded on the tape by the pilot of the aircraft or other authorized person.

FIGURES 2A, 2B, and 2C, show diagrammatically three sequences D, E and F of the device when used to give the location of a submerged submarine. Sequence D, see FIGURE 2A, illustrates the device being released from a sunken submarine, the spherical casing that encloses the device being strong enough to withstand the water pressure without collapsing. Sequence E, see FIGURE 2B, shows the casing or container at the surface of the water with the timing mechanism opening the container and inflating the balloon for lifting the device into the air to make it airborne. Sequence F, see FIGURE 2C, illustrates the device continually broadcasting the location of the submerged submarine and is similar to sequence C of FIGURE 1.

FIGURE 3 is an enlarged sectional schematic view taken through the spherical container or casing and illustrates the mechanical timer, the deflated balloon with the gas-containing cartridge for inflating it, and the recording and transmitting device that is to be freed when the container is opened and is to be supported by the balloon when the latter is inflated. The two halves of the container are shown closed and held in closed position by solenoid actuated releasable armature pins.

FIGURE 4 is similar to FIGURE 3, and shows the pins retracted by the energized solenoids and the hemispherical halves of the container freed from each other preparatory to inflating the ballon for lifting the device clear of the opened container.

FIGURE 5 is the same as FIGURE 3 except that the two halves of the spherical container or casing are secured together by pins that are mechanically retracted into released position after the timing mechanism has operated for a previously set time period.

FIGURE 6 is like FIGURE 4 except the locking pins for holding the two hemi-spherical halves closed are mechanically released instead of by solenoids.

While I have shown only the preferred forms of my invention, it should be understood that various changes,

Detailed description

In carrying out my invention, I will first describe the device in detail and then will show how it can be used to locate a downed or wrecked aircraft or to locate a sunken submarine. FIGURE 3 is a section through a spherical container indicated generally at G and comprising two hemi-spherical halves G1 and G2. The hemi-spherical half G1 has an annular flange 1 that is designed to mate with an annular flange 2 on the hemi-spherical half G2 when the two halves are brought into closed position for making the container liquid tight. Any type of locking mechanism may be used for securing the two hemi-spherical halves G1 and G2, together. I have shown solenoid releasable pins for accomplishing this purpose in FIGURES 3 and 4.

A pair of solenoids H are mounted in the hemi-spherical half G1, see FIGURES 3 and 4, and these have armatures 3 that function as locking pins and slide in bores 4 in the annular flange 1 and are removably received in bores 5 in the annular flange 2, the latter bores being in alignment with the bores 4. When the solenoids H are energized, they will retract their armature locking pins 3 from the bores 5 for freeing the two hemi-spherical casing parts G1 and G2 from each other.

A mechanical or electrical timer, indicated generally at J, is mounted in the hemi-spherical half G1, see FIGURE 3. If the timer is mechanically operated then a spring-winding shaft with knob 6 is used for winding a spring, not shown. The timer J can be set to close an electric switch 7 after a desired time period. An elapsed time setting shaft and knob 8 are used to control the amount of time that will elapse from the freeing of the container or casing G from the aircraft or submarine until the switch 7 will be closed for connecting the solenoids H to a source of electric current such as a battery K that is mounted in the casing half G1. Wires 9 electrically connect the switch 7 to the solenoids H and to the battery K. For example the timer can be set to close the switch 7 after an elapsed time from zero up to two hours although I do not wish to be confined to any precise period of time.

In the other half G2 of the casing or container G, I mount a tape deck or recorder with an amplifier and modulator indicated schematically at L in FIGURES 3 and 4. A radio transmitter M is associated with the tape recorder L so as to broadcast the message recorded on the tape by the pilot or other authorized person when the tape recorder and transmitter are freed from the half sphere G2. A battery N forms a part of the signal transmitting package and a relay P may be closed when the package is freed from the half sphere for connecting the battery N to the recorder and transmitter for operating both so that the message recorded on the tape will be continuously broadcast for any desired period of time. The broadcast package consisting of the items L, M, N and P are removably mounted in a socket 10 in the half sphere G2 and a stop 11 in the other half sphere G1, holds the package in the socket.

The socket 10 has a cavity 12 communicating therewith and an ejector spring 13 is mounted therein for pressing against the signal transmitting package for ejecting it from the socket as soon as the half sphere G1 is freed from the other half sphere G2 and the stop 11 is removed from holding the package in the socket. One or more ejector springs may be used. FIGURE 3 further shows the transmitter M provided with an antenna 14 that may be received in the cavity 12 until the package is freed from the socket.

I provide a balloon Q for lifting the signal transmitting package into the air when the spherical container or casing G is opened. The balloon is shown in its deflated condition in the spherical casing in FIGURES 3 and 4. A nylon cord 15 connects the balloon to the signal transmitting package which includes the tape recorder L, the radio transmitter M and the battery N, together with the relay P. The balloon is inflated as it leaves the opened spherical casing G and this is accomplished in a novel manner.

A gas cylinder or cartridge R is secured to the signal transmitting package by a strap 16 or other suitable fastening means and it contains a sufficient quantity of liquid gas to inflate the balloon Q shown in FIGURE 3. A gas conveying conduit 17 has one end communicating with the deflated balloon Q and has its other end communicating with the interior of a valve casing 18, see FIGURE 3. A spring actuated valve 19 is mounted in the valve casing and normally closes a gas conveying passage that communicates with the interior of the gas cylinder or cartridge R. The outer end of the stem of the valve 19 bears against a projecting 20 provided in the half sphere G2 and this projection keeps the valve 19 seated so as to prevent the flow of gas from the cartridge R so long as the two half spheres G1 and G2 are connected together by the armature pins 3.

It will be seen from this construction that as soon as the solenoids H retract the armature pins 3 from the bores 5 in the half sphere G2, the ejector spring 13 will remove the signal transmitting package from the socket or pocket 10, and move the gas cartridge R and the stem of the valve 19 therewith so that the valve stem will be carried off from the projection 20. The spring-biased valve 19 will immediately open and permit gas to flow from the cylinder or cartridge R, through the conduit 17 and into the balloon for inflating it. The inflated balloon will lift the device and the cylinder R clear of the half sphere G2.

Before describing the operation of the device, it is best to briefly describe a slightly modified form of my invention shown in FIGURES 5 and 6. This modified form is the same as the form shown in FIGURES 3 and 4 except that the two half spheres S1 and S2 are held together by pins 25 that are mechanically retracted into released position instead of being actuated by the solenoids H as shown in FIGURES 3 and 4. Similar parts between the spherical container S and the spherical container G will be given like reference letters and numerals except that the parts shown in FIGURES 5 and 6, will be primed. The fastening pins 25 are slidably mounted in bores 4' in the annular flange 1' of the half sphere S1, and are removably received in bores 5' in the annular flange 2' of the half sphere S2. Bell-crank levers T are pivotally mounted in the half sphere S1 at 26 and each has a slot at one end for slidably receiving a pin that pivotally connects the inner end of an associate fastening pin 25 to the lever. The bell-crank levers T are spring biased so as to yieldingly hold the pins 25 in locked position for securing the two half spheres S1 and S2, together.

The timer J' is actuated by a spring, not shown, which in turn can be wound up by manually rotating the knob and shaft 6'. In place of the electric switch 7 for the timer J, the timer J' has a shaft 27 that carries a drum 28, see FIGURES 5 and 6. A pair of cables 29 have their inner ends attached to the drum 28 and have portions engaging with idler pulleys 30. The outer ends of the cables are connected to the slotted ends of the bell-crank levers T. The timer J' can be set by operating an elapsed time setting shaft 8' to cause the shaft 27 to rotate the drum 28 to wind up the pair of cables 29 after a predetermined elapsed time period has expired. This will swing the bell-crank levers T to retract the pins 25 from the bores 5' and free the two half-spheres S1 and S2 from each other.

All of the other parts in the spherical casing S are identical to the similar parts in the spherical casing G, and further detailed description of the modified form of the device shown in FIGURES 5 and 6, need not be given. As soon as the two half spheres S1 and S2 are freed from each other, the balloon Q' will be inflated and will lift the signal transmitting package free of the half sphere S2.

Operation

From the foregoing description of the various parts of the device the operation thereof may be readily understood. I have previously stated that the device can be used for broadcasting the location of an aircraft or a submarine. The three sequences D, E and F, illustrated in FIGURES 2A, 2B, and 2C, give an example of the use of the device in connection with a sunken submarine.

The submarine U is shown in sequence D of FIGURE 2A, as sunk in a body of water whose surface is shown at 50 in sequence E of FIGURE 2B. Referring again to FIGURE 3, an inner control cable 21, extends from the relay P and is releasably connected to a socket 22 that is carried by the wall of the half sphere G2. An outer cable 23 is removably connected to the outer end of the socket 22 and is part of the communicating system of the craft. The cable is electrically connected to the communicating system when an emergency switch, not shown, is closed. The pilot of the aircraft or the captain of a submarine or other authorized person can talk into the communicating system of the craft and his message will be recorded on the tape deck for later broadcasting by the signal transmitting package when ejected from the opened sphere and made airborne by the inflated balloon.

The submarine captain or other authorized agent upon realizing the submarine has become disabled and that it cannot rise to the surface 50 of the body of water shown in sequence D in FIGURE 2A, closes the emergency switch and speaks into the communication system, giving the latitude, longitude and depth of the sunken craft. He can also give any other data that he wishes recorded on the tape and later to be broadcasted such as the cause of the trouble, etc. The tape cartridge is of the continuous type and has sufficient length to record the message of the person authorized to speak. The outer cable 23 may now be pulled free of the socket 22 and the spherical container is ready to be released from the craft.

The operator now sees that the spring, not shown, for the timer J or J' is wound up and the desired elapsed time sas been set by adjusting the knob 8 and its shaft. The timer is set to operating and the spherical casing G or S is released from the submarine U in any desired manner. I have shown in sequence D of FIGURE 2, the spherical casing G just being freed from the submarine. The wall for the casing G is made strong enough to withstand the enormous water pressure without collapsing.

The spherical casing G rises to the surface 50 of the body of water and sufficient elapsed time has been set by the shaft and knob 8 or 8' to permit the casing to reach the surface before either the pins 3 or the pins 25 are retracted to free the two half spheres G1 and G2 or S1 and S2 from each other. Sequence E of FIGURE 2B shows the half sphere G1 just separated from the half sphere G2, and the balloon Q has just been inflated by the gas from the gas cylinder or cartridge R. The nylon cord 15 is pulling the signal transmitting package including the tape deck, amplifier-modulator L and the transmitter M, free of the half sphere G2. This will pull the cable 21 from the socket 22. Then sequence F of FIGURE 2C, shows the balloon Q supporting the signal transmitting package in the air. The antenna 14 is broadcasting the distress signal from the continuously operating tape recorder. Means, not shown, in FIGURE 3 has automatically closed the relay P which has connected the tape recorder to the battery N. The battery will operate the tape recorder continuously for a desired length of time and during this time the antenna 14 will be broadcasting the data previously recorded on the tape recorder. Sequence F of FIGURE 2C further shows a satellite V that can receive the radio - — signals from the antenna 14 and rebroadcast them to receiving stations on ships, or land or on aircraft.

It is vital in the saving of life on a disabled submarine U to locate the vessel as soon as possible. My device will broadcast the exact location and depth of the submarine in the water. Rescue craft can reach the scene of the disaster within a very short time and there is no need to search a wide area which would otherwise be required if the submarine's location were not known. Also the news of the disabled submarine can be released immediately and it will not be necessary for the screw to remain trapped for an unwarranted period of time before others will realize that something has happened and a search is started.

In FIGURE 1A, sequence A shows a disabled aircraft W starting to descend to the earth. Again the pilot or other authorized party has recorded on the tape recorder the longitude and latitude of the aircraft and the apparent reason for the trouble. The spherical casing G is released from the aircraft and a parachute X supports the casing until the casing clears the aircraft. The timer J or J' will now free the two casing half spheres G1 and G2 from each other as shown in sequence B, FIGURE 1B, and the balloon Q will be inflated for supporting the signal transmitting package in the air. Sequence C of FIGURE 1C illustrates the balloon Q supporting the device and the antenna 14 is broadcasting the signal to the satellite V. Sequence C in FIGURE 1C is the same as sequence F of FIGURE 2C.

Again the information about the disaster is given promptly and rescue equipment can be rushed to the scene without any undue delay. No time is lost in searching for the aircraft.

The timing of the elapsed time control is set from zero up to five minutes, this depending upon the height the aircraft is above the earth at the time the spherical casing G or S is released from it. The tape recorder L can have up to two hours operating time or longer if desired. The device may be made small by using a transistorized transmitter M and mercury batteries N. The balloon Q is large enough for it to gain altitude and carry the signal transmitting package with it so that a larger area is covered by the signals. The spherical casing is made strong enough to withstand the high speed of the aircraft at the moment the sphere is released.

The relay P may be of any standard type such as a two single pole, single throw with its contacts in normal open position. The relay can have a trip mechanism to lock it in "ON" position permanently when once the signal transmitting package is freed from the spherical casing. The mechanical timer J can be of any type desired and can have the single pole, single throw switch 7, for the purpose of energizing the solenoids H when the switch is closed.

The device could be used in time of war by a submarine captain or an aircraft pilot to broadcast by code, the location of the enemy. In this event the elapsed time mechanism would be set to function at a sufficiently later time to give the captain or pilot the opportunity to move his craft away from the danger zone before the broadcasting starts.

In its simplist form my invention comprises an openable container with two separable parts. Fasteners 3 or 25 secure the two parts together. An adjustable timing means is mounted in one part and a signal transmitting package is removably mounted in the other part. An inflatable buoyant means such as the balloon is inflated when the two parts are separated and will make the signal transmitting package airborne.

I claim:
1. In combination:
    (a) an openable container comprising a first part and a second part separable from each other;
    (b) fasteners removably securing the two parts together;
    (c) adjustable timing means in said first container part and operatively connected to said fasteners for moving them into released position after a predetermined time has elapsed for freeing the two separable parts from each other;
    (d) a radio signal transmitting package removably mounted in said second part;

(e) inflatable buoyant means in said container and attached to said signal transmitting package for automatically removing it from said container when said container is opened and making the package airborne when said buoyant means is inflated so that said package can broadcast the signal; and (f) means for inflating said buoyant means when said container parts are freed from each other so that the inflated buoyant means will make said package airborne while it is broadcasting.

2. The combination as set forth in claim 1: and in which (a) said inflatable buoyant means includes;
(b) a gas cartridge;
(c) a deflated balloon;
(d) a conduit for conveying gas from said cartridge to said balloon; and
(e) a valve normally closing said conduit; said valve being opened when said container parts are freed from each other to permit gas to flow from said cartridge to inflate said balloon.

3. The combination as set forth in claim 2: and in which (a) said valve being carried by said radio signal transmitting package and having a spring-biased valve stem for urging said valve into open position; said container having a projection against which said valve stem presses for keeping said valve closed;
(b) a socket in said second container part for removably supporting said radio signal transmitting package;
(c) spring means mounted in said socket for aiding the balloon in removing said package from said container when the two parts of said container are freed from each other, the removal of the package from the socket also removing said valve stem from said projection for permitting said valve to automatically open;
(d) whereby said balloon is inflated and will lift said package clear of said opened container and carry it up into the air and keep it airborne during broadcasting.

4. The combination as set forth in claim 1: and in which (a) said radio signal transmitting package includes a tape deck designed to receive an emergency message from an operator;
(b) electrical wiring leading from said tape deck to an electric socket mounted in said container wall and being removal therefrom when said package is freed from the container when the latter is opened;
(c) exterior electric wiring removably connected to said socket from outside the container and being used by the operator for placing a particular emergency message on the tape deck; said exterior electric wiring being automatically removed from said socket when said container is freed from the craft; and said first-mentioned electric wiring being freed from said socket when said package is freed from said container;
(d) whereby the emergency message broadcast by said radio transmitter is the one previously delivered into the tape deck by the operator.

References Cited

UNITED STATES PATENTS

| | | | |
|---|---|---|---|
| 2,519,553 | 8/1950 | Faulkner | 325—114 |
| 2,628,307 | 2/1953 | Lloyd et al. | 325—114 |
| 2,825,803 | 3/1958 | Newbrough | 325—114 X |
| 2,928,935 | 3/1960 | Murray | 325—116 X |
| 3,277,429 | 10/1966 | Hammond | 325—116 X |

FOREIGN PATENTS 411,312   6/1934   Great Britain.

ROBERT L. GRIFFIN, Primary Examiner.

B. V. SAFOUREK, Assistant Examiner.

U.S. Cl. X.R.

325—114, 115, 116; 244—138